Nov. 21, 1950

P. GLASS 2,531,211

ELECTRICAL CONTROL CIRCUIT

Filed Oct. 12, 1945

2 Sheets-Sheet 1

INVENTOR.
Paul Glass,
BY
Chritton, Wiles, Schroeder, Merriam & Hofgren Att'ys

Nov. 21, 1950 P. GLASS 2,531,211

ELECTRICAL CONTROL CIRCUIT

Filed Oct. 12, 1945 2 Sheets-Sheet 2

INVENTOR.
Paul Glass,
BY Chritton, Wiles, Schroeder,
Merriam & Hofgren Attys

Patented Nov. 21, 1950

2,531,211

UNITED STATES PATENT OFFICE 2,531,211

ELECTRICAL CONTROL CIRCUIT

Paul Glass, Chicago, Ill., assignor to Askania Regulator Company, Chicago, Ill., a corporation of Illinois Application October 12, 1945, Serial No. 622,057

2 Claims. (Cl. 171—119)

The invention relates generally to electrical control circuits and more particularly to control circuits wherein a small signal is utilized to govern substantially larger power application or where the signal is amplified or modified, or both, for subsequent use in its amplified and/or modified form.

Heretofore circuits of the character described have depended largely upon electron tubes for accomplishment of the ends sought, necessitating complicated circuits or excessive numbers of stages of amplification with the resultant disadvantages of high cost, operational and maintenance difficulties and, above all, the disadvantage that the controlling portion of the circuit was not completely independent of the controlled portion so that reaction in the controlled portion might reflect into the controlling portion with possible resultant injury thereto.

It is an object of this invention, therefore, to provide new and improved circuits for the amplification or modification, or both, of a signal or for the utilization of a small signal in the control of substantially larger power application.

Another object of the invention is to provide new and improved electrical control circuits adaptable to respond either to alternating current or direct current signals and adaptable to produce alternating current.

Another object is to provide new and improved electrical control circuits in which the input or controlling circuit is completely separated electrically from the output or controlled circuit and cannot be influenced by the output circuit.

Another object is to provide a new and improved circuit of the character described having an electron tubeless, main amplification or control stage and an input signal circuit in advance of the main stage conditioning the signal by modification and possibly also amplification for use in connection with the main stage.

Still another object is to provide a new and improved control circuit in which the main amplification and control means is composed of saturable reactors.

A further object is to provide a control circuit including saturable reactors, which will function, under the control of either a D. C. or an A. C. signal, to produce an A. C. output at a pair of output stations, the output at one of the stations varying in magnitude directly and at the other of the stations indirectly with the signal magnitude, which of the stations has the output varying directly and which indirectly being determined by the sign of the input signal.

Other objects and advantages will become apparent from the following detailed description taken in connection with the accompanying drawings, in which.

Figures 1, 2, 3, 4:
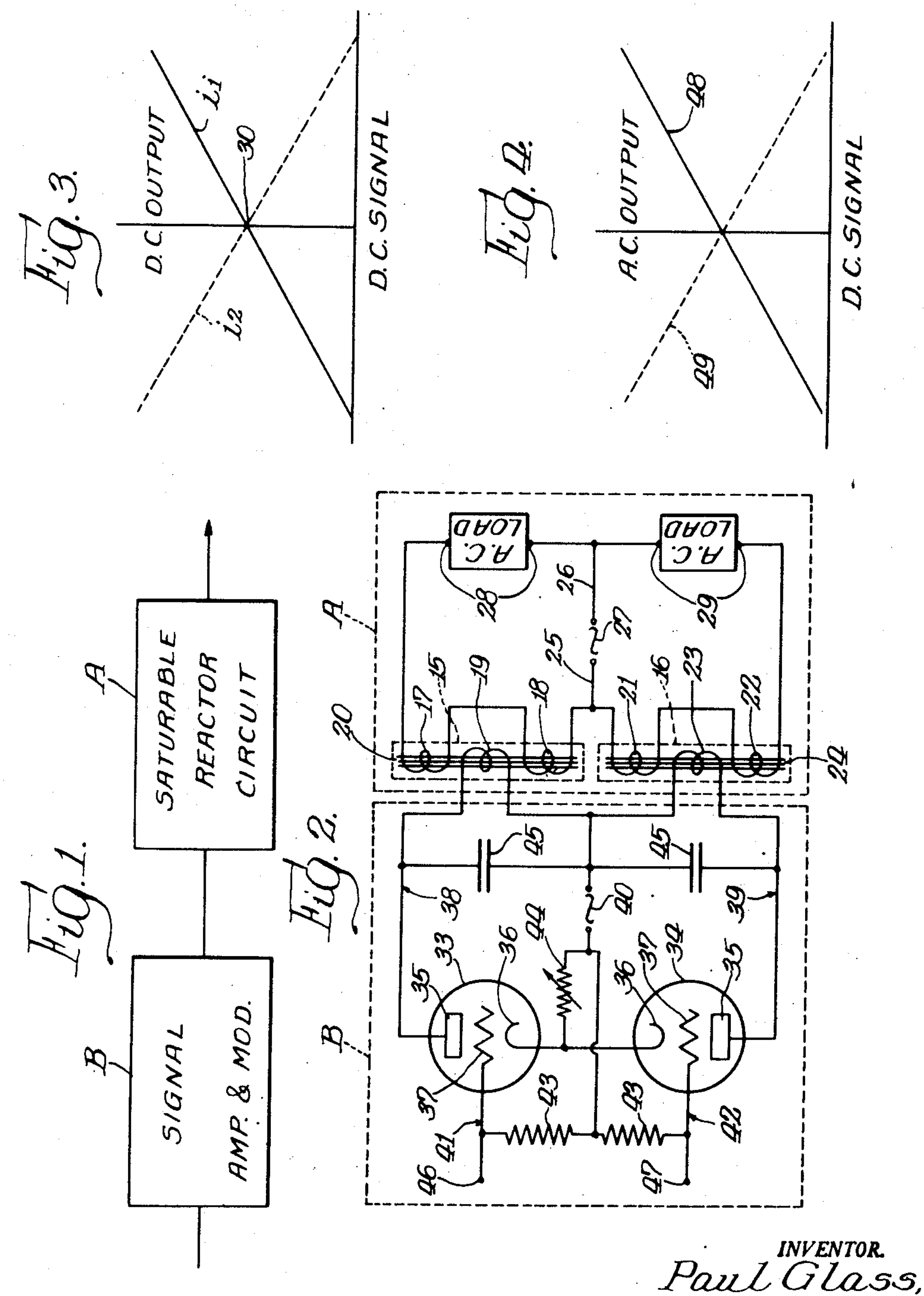
Fig. 1 is a box-type diagrammatic illustration of a circuit embodying the features of this invention.
Fig. 2 is a circuit diagram illustrating in detail a possible construction that the units represented by the rectangles in Fig. 1 may take.
Fig. 3 is a diagram illustrating the character of the output of the first unit of the circuit.
Fig. 4 is a diagram similar to Fig. 3 but illustrating the character of the end output of the circuit.

For purposes of disclosure there is shown in the drawings and will hereinafter be described a general and several specific circuits, being illustrative embodiments of the invention. It is not intended, however, that the invention is to be limited thereby to the specific disclosures made. On the contrary, it is intended to cover all modifications and alternative constructions falling within the spirit and scope of the invention as defined in the appended claims.

Generally speaking, the invention contemplates the provision of a new and improved circuit wherein a small electrical signal is utilized to govern substantially larger power applications or where the signal is amplified or modified, possibly both, for subsequent use in its new form. In such a circuit the input is a controlling signal while the output is a controlled signal regardless of whether the latter is of a magnitude commonly referred to as a signal or is of such magnitude as to be, or is in fact, the operating energy for an electrical device such as a motor or the like. To that end, the circuit is composed generally of means for modifying and possibly amplifying the controlling signal and means functioning as the main amplifying or control means.

Herein the general circuit (see Fig. 1) is composed of two subcircuits or circuit units or portions A and B. Of these units, A is the main amplifying or control means or circuit and functions to have an alternating current output controlled as to magnitude by the controlling or input signal, but having an independent power source so that the absolute power output is not limited by the power of the signal source. Unit B is the control signal receiving unit. This unit usually functions to amplify the signal but, above all, it modifies the character of the signal so as first to obtain a signal of a character suitable for use with unit A, and, secondly, to obtain a signal of such character as to result in an output of a character desired. Herein the resultant signal is always a D. C. signal whose magnitude is a straight line function of the input signal. The term "direct current" or its abbreviation D. C., as herein employed to designate the output of the unit B and the control coils of the unit A, is used in the broad sense of that term, i. e., as opposed to alternating current and as including pulsating current such as produced by a generator or rectifier and not in the limited sense only of absolutely continuous, pulse-free current such as produced by a chemical cell under constant load.

As the description proceeds, it will become apparent that by appropriate construction of the unit B the invention may be employed to respond either to an A. C. or a D. C. input or control signal, the output always being A. C. Moreover, by the employment of A. C. or D. C. signal receiving units B and a main amplifying or control means A, all of the character hereinafter described, circuits embodying the concept of this invention may be employed to obtain an A. C. output at two stations, the magnitude of the output at the stations varying in opposite directions but in relationship to the magnitude of the input signal and with the sign of the input signal determining which station output increases and which decreases. The meaning of the term "sign" as applied to D. C. signals or output is, of course, the customary meaning and hence will be understood. The meaning herein of the term "sign" as applied to an A. C. signal or output is that of 180° phase displacement. Thus circuits embodying the concept of this invention may be employed as A. C. amplifiers, as amplifiers and converters of D. C. to A. C., or as means for controlling simultaneously and inversely the magnitude of A. C. output at two stations by either A. C. or D. C. signals. In speaking of A. C. or D. C. currents or outputs, average and effective and not instantaneous values or magnitudes are intended.

Turning now to a consideration of the more detailed embodiments of the invention, the unit A will first be described. This unit, as already stated, is the main amplification stage and control unit or subcircuit and accomplishes control of the magnitude of the output and its availability at two stations in accordance with the magnitude and sign of the signal without the employment of electron tubes. The unit A is the same in all of the circuits disclosed herein and it will thus be described in detail but once in connection with the description of the circuit disclosed in Fig. 2. Referring to Fig. 2, the unit A comprises a pair of saturable reactors represented by the broken-line rectangles 15 and 16. The saturable reactor 15 is composed of a pair of A. C. coils 17 and 18 and of a D. C. or control coil 19. All of the coils are wound on a common iron core 20 in such manner that current flowing in the coils 17 and 18 will not induce current or voltage in the D. C. coil 19, while flux produced by direct current flowing in the D. C. coil 19 will vary the impedance of the A. C. coils 17 and 18 by varying the degree of saturation of the core 20. The reactor is further so designed that the coils 17 and 18 have a very high impedance when no current is flowing in the D. C. coil 19. Necessarily the reactor and particularly the coils thereof must be designed with a view to the voltages with which it is to be employed, with the coils 17 and 18 being capable of taking substantially the full applied voltage when no current is flowing in the D. C. coil 19. The saturable reactor 16 is identical with the reactor 15 and comprises A. C. coils 21 and 22 and a D. C. or control coil 23, all wound on a common iron core 24.

The unit A, sometimes hereinafter referred to as the saturable reactor circuit, is completed by an A. C. supply circuit comprising power supply leads 25 and 26 adapted to be connected to an A. C. power source represented at 27 and two output stations herein represented by pairs of terminals 28 and 29, the unit A thus being adapted for the connection thereto of two loads. The A. C. coils of the saturable reactors are so connected in the supply circuit that both pairs of terminals 28, 29 will simultaneously be subjected to varying proportions of the potential of the power source depending upon the proportionate energization of the control coils of the saturable reactors. To that end, the saturable reactors, that is, the A. C. coils thereof, are connected in separate yet interconnected circuits each having the A. C. coils of one reactor, the terminals representing one station, and the A. C. power source in series with the power source common to the two circuits. Herein the terminals 28 are connected in series with the coils 17 and 18 of the saturable reactor 15, the coils also being in series, and the terminals 29 are in series with the coils 21 and 22 of the saturable reactor 16, the coils again being also in series. Inasmuch as the saturable reactors are designed so as to be capable of taking substantially the full applied voltage of the power source 27 when the control coils 19 are not energized, it follows that the potential across either pair of terminals may vary from substantially zero to the full magnitude of the power source 27 depending upon the energization of the control coils of the saturable reactors.

In the embodiment of the invention shown in Fig. 2, the circuit is adapted to respond to a D. C. input or control signal. Accordingly, there is illustrated, by way of example, a unit B which is operable to receive a D. C. signal, amplify the same to a magnitude suitable for use in connection with the saturable reactors 15 and 16 and, at the same time, cause energization of one or the other, or both, of the D. C. windings 19 and 23, as may be desired. Herein the unit B is of such character that an input signal will cause energization of the D. C. windings 19 and 23, as shown in Fig. 3, wherein the line $i1$ represents the current flowing in the coil 19 and $i2$ represents the current flowing in the coil 23. In other words, when the input signal is zero the coils 19 and 23 will each have the same current flowing therein with a value as represented by the crossing of the lines $i1$ and $i2$ at the point 30. With an increase in the signal magnitude, the current in the coil 19 will increase, while the current in the coil 23 will decrease at the same rate. Upon reversal of the sign of the signal and increase in magnitude, the current in the coil 23 will increase while the current in the coil 19 will decrease again at the same rate.

While a unit B capable of producing currents in the coils 19 and 23 of the character described might take a variety of forms, one such unit is shown in Fig. 2, it being understood that the showing is exemplary only and that a variety of other subcircuits might be employed and that, in particular, it might prove necessary to have more than one stage to produce the amplification of the signal required to provide direct currents of a magnitude suitable for control of saturable reactors. Herein the unit B or signal input circuit comprises a pair of electron tubes 33 and 34 each having a plate 35, a cathode 36 and a grid 37. The tube 33 has a plate circuit, generally designated 38, which includes the D. C. coil 19 of the saturable reactor 15 and the tube 34 has a plate circuit, generally designated 39, which includes the D. C. coil 23 of the saturable reactor 16. An A. C. plate voltage is employed in this illustrative embodiment. The plate voltage for both tubes is supplied by an A. C. voltage source, represented at 40, connected to be common to the two plate circuits 38 and 39. Each of the tubes 33 and 34 has a grid circuit, generally designated 41 and 42, respectively, with each circuit including a resistance 43. Biasing the tubes is a variable resistance 44 connected in well known manner between the cathodes 36 and the voltage source. In order that current may flow in the control coils 19 and 23 during the half cycle when the plates 35 are negative as well as when they are positive, a condenser 45 is preferably connected across each of the control coils. The D. C. signal input terminals 46 and 47 are connected to the not common ends of the resistances 43. As above indicated, the tubes 33 and 34 are normally so biased that at zero magnitude of input signal an equal current will flow in the plate circuits of the tubes. As the signal increases in magnitude from zero value, the current in the plate circuit of one of the tubes will increase, while the current in the plate circuit of the other of the tubes will decrease proportionally. Which tube increases and which decreases upon a signal increase is determined by the sign or polarity of the input signal.

For ready understanding of this invention, the operation of the circuit as thus far described will now be set forth. Let it be assumed, therefore, that the input signal is zero. Under this assumption, the direct current flowing in the coils 19 and 23 will be equal and, moreover, there will, due to the bias of the tubes, be a current of definite value (see Fig. 3), herein of about one-half the maximum output of the unit B. Under these conditions the impedance of the A. C. coils of both of the reactors 15 and 16 will be reduced by equal amounts and herein be about half so that there will be output at each of the sets of terminals 28 and 29, this output being the same at both sets of terminals and equal to about half of the maximum output. Let it next be assumed that the sign or polarity of the D. C. input signal is such that an increase in signal magnitude falls to the right of the vertical axis of the graph of Fig. 3. Under those circumstances the current $i1$ flowing in the control coil 19 will increase and the current $i2$ flowing in the control coil 23 will decrease, such increase and decrease being by equal amounts and proportional to the increase in signal input. With such increased flow of current in the control coil 19, the impedance of the A. C. coils 17 and 18 of the saturable reactor 15 will decrease and hence there will be a corresponding increase in the voltage across the terminals 28, that is, increased output. The decrease in the current flowing in the control coil 23 will produce a corresponding increase in the impedance of the A. C. coils of the saturable reactors 16 and hence there will be a decrease in the potential across the terminals 29, that is a decrease in output. At the signal magnitude increases more and more the current in the control coil 19 will, of course, continue its increase, while the current in the control coil 23 will continue to decrease until the former is a maximum and the latter is a minimum, and correspondingly the output at the terminals 28 will increase to a maximum while the output at the terminals 29 will decrease to a minimum.

If now it be assumed that the sign or polarity of the input signal is reversed and then increases in magnitude as before, just the opposite will occur. An increase in signal magnitude now falls to the left of the vertical axis of the graph of Fig. 3 and hence an increase in signal magnitude will decrease the current in the control coil 19 but will increase the current in the control coil 23 again by proportional amounts. Likewise, the output at the terminals 28 and 29 is opposite to the other assumed condition, with the output at the terminals 28 now decreasing with an increase in signal magnitude and the output at the terminals 29 increasing with an increase in signal magnitude. The output at the terminals 28 and 29 is thus a proportional function of the control current, with the output at the terminals 28 represented generally by the line 48 and the output at the terminals 29 represented generally by the line 49 of the exemplary graph of Fig. 4. It is understood that Fig. 4 is not a plotted graph but an illustrative showing only. The magnetization curve of the iron cores of the reactors and other factors may well cause the output to depart somewhat from the straight line shown. The output, of course, is an alternating current output which at zero input signal is equal at both sets of terminals and of a value approximately half of the maximum output. The output at each set of terminals may be varied from substantially zero to maximum and, with an increase in magnitude of the input signal, the output at one of the sets of terminals 28, 29 will increase while the output at the other set of terminals will decrease, the set of terminals at which the output increases with an increase in signal magnitude being determined by the sign or polarity of the input signal.

It will be readily apparent from the foregoing that the circuit of Fig. 2 gives simultaneous control by means of a D. C. signal over the power supplied to a pair of A. C. loads. The output bears a proportional relationship to the magnitude of the input signal but, depending upon the polarity of the input signal, varies alternately in a direct and in an inverse relationship. It is also pointed out that with the A. C. coils of the saturable reactors so connected as to prevent their inducing any voltage in the associated D. C. control coil, the saturable reactor circuit is incapable of influencing the signal input circuit and thus reactions of the controlled signal, that is, the output of the saturable reactor circuit, be it of a character to be classified as a signal or be it the actual power supplied to a load, such as a motor or the like, cannot be reflected back into the signal input circuit.

Figure 5:
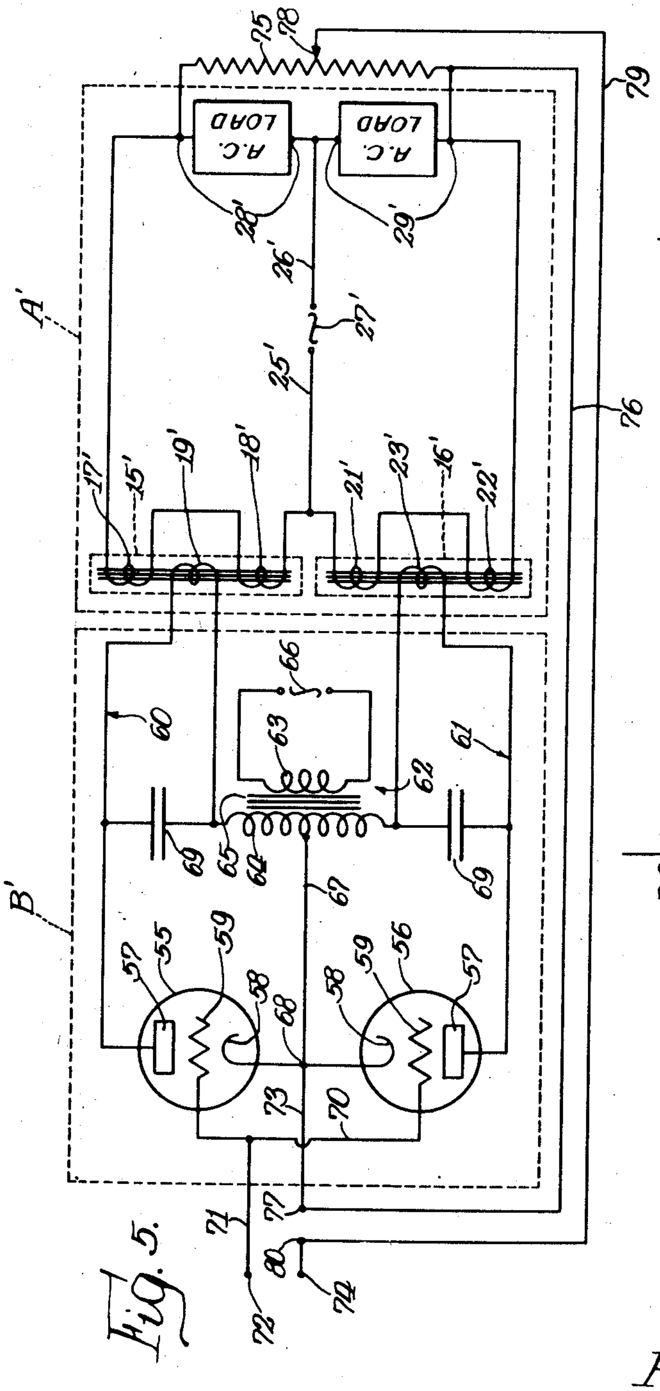
Fig. 5 is a circuit diagram illustrating another specific form that the units represented by the rectangles of Fig. 1 may take.
Figure 7:
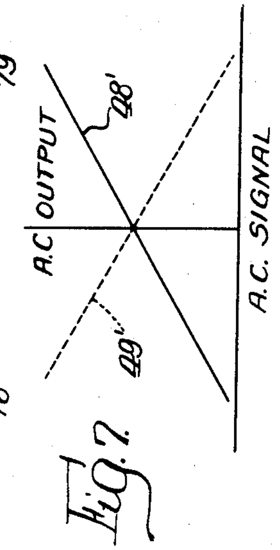
Fig. 7 is a diagram similar to Fig. 6 but illustrating the character of the end output of the circuit.
Figure 6:
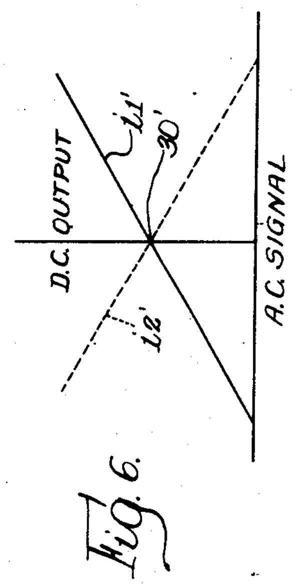
Fig. 6 is a diagram illustrating the character of the output of the first unit of Fig. 5.

In Figs. 5 to 7, inclusive, there is disclosed an embodiment of my invention in a circuit responding to or controlled by an A. C. signal. Referring to Fig. 5, the circuit therein disclosed is composed of a saturable reactor circuit A′ and an input signal amplifying and modifying unit or subcircuit B′. The saturable reactor circuit or the unit A′ is identical with the unit A shown in Fig. 2. Suffice it to say, therefore, that the unit A′ is composed of two saturable reactors 15′ and 16′ and that the reactor 15′ has two A. C. coils 17′ and 18′ and a D. C. or control coil 19′, and that the reactor 16′ has two A. C. coils 21′ and 22′ and a D. C. or control coil 23′. Completing the saturable reactor circuit is a supply circuit having power leads 25′ and 26′ connected to a source of alternating current power, represented at 27′, and two sets of output terminals 28′ and 29′. The coils are connected as described in connection with Fig. 2.

Unit B′, the signal input circuit, like the unit B of Fig. 2, is adapted to receive the input or control signal, amplify it so as to convert it to a value capable of use with saturable reactors, and modify or condition the signal for use with saturable reactors and to accomplish the end here sought. Such modification in this form of the invention involves conversion of the signal from A. C. to D. C. and further involves modification to result in a signal of appropriate character. Herein the unit B′ must be such as to result in a current in the D. C. windings 19′ and 23′ of the character illustrated in Fig. 6. In other words if $i1'$ represents the current flowing in the winding 19′ and $i2'$ represents the current flowing in the winding 23′, the currents in the windings 19′ and 23′ at zero value of input signal must be equal and must have a value such as represented by the point 30′ at which the line representing the current $i1'$ and the line representing the current $i2'$ cross in the graph of Fig. 6. It will be seen from this figure that as the signal increases in value from zero the current in one of the D. C. windings will increase, while the current in the other D. C. winding will decrease, the increase and decrease being proportional to one another and also proportional to the increase in signal magnitude. Depending upon the sign of the input signal, one or the other of the coils 19′ and 23′ will have the current flow therein increased, while the other will have the current flow therein decreased.

Shown in Fig. 5 for exemplary purposes only, is being understood that a variety of other circuits might be employed and that, in particular, it might be necessary to provide more than a single amplification stage, is one specific embodiment that the unit B′ may take. As shown in that figure, unit B′ comprises a pair of grid controlled, electron tubes 55 and 56, each having a plate 57, a cathode 58 and a grid 59. The tube 55 has a plate circuit, generally designated 60, having therein the D. C. coil 19′ of the saturable reactor 15′. The tube 56 has a plate circuit, generally designated 61, which has connected therein the D. C. coil 23′ of the saturable reactor 16′. Alternating current plate potential is herein employed and is provided through the medium of a transformer 62 having a primary winding 63, a secondary winding 64 and a core 65. The primary winding 63 is connected to a source of alternating current represented at 66 and the secondary winding 64 is connected in the plate circuits. A lead 67 extends from the midpoint of the secondary winding 64 to a juncture point 68 of the cathodes 58 to complete the plate circuits. If desired, each of the plate circuits includes a condenser 69 connected in parallel with the D. C. coil and operating in well known manner to cause flow of unidirectional current during the negative half cycle of the plate voltage of the tube with which the condenser is associated. The grids 59 are interconnected by a lead 70 from which extends a lead 71 ending in a terminal 72 constituting one of a pair of signal input terminals. The juncture point 68 actually constitutes the other of the input terminals but for convenience it is brought out to a terminal 74 by means of a lead 73. As a result of this circuit the tubes 55 and 56 are not biased to cut off at zero magnitude of input signal but at zero signal each produces current flow of a magnitude represented at 30′ in Fig. 6 and functions as above described to produce currents of the character represented in Fig. 3.

The operation of the circuit of Fig. 5 is the same as that of Fig. 2. Suffice it to say, therefore, that the output at each of the sets of terminals 28′, 29′, bears a proportional relationship to the input signal with the output at the terminals 28′ represented by the line 48′ and the output at the terminals 29′ represented by the line 49′ of Fig. 7. With this embodiment of the invention, a pair of A. C. loads may be simultaneously but oppositely controlled by an A. C. signal, the output to the loads at one time increasing and at another time decreasing with signal magnitude depending upon the sign of the input signal.

The circuit of Fig. 5 lends itself admirably to the employment of a negative feed-back. Accordingly, there is connected across both sets of terminals 28′ and 29′ a potentiometer 75. One end of the potentiometer is by a lead 76 connected into the lead 73 at 77 while the movable contact 78 is by a lead 79 connected into the lead 73 at 80. The lead 73 is, of course, broken between 80 and 77 for this connection of the potentiometer 75 in series therein. The negative feed-back operates in well known manner to stabilize the operation of the circuit and thus enable it to have a truly linear output function.

I claim as my invention:

1. An electrical control circuit comprising a direct current signal input circuit comprising a pair of grid controlled electron tubes each having a plate, a cathode and a grid, a plate circuit for each of said tubes including output terminals and a condenser in parallel with the output terminal, said plate circuits being adapted for the connection therein of an alternating current voltage source common to said plate circuits and having therein a variable resistance intermediate the voltage source and the cathodes, and a grid circuit for each of said tubes including a resistance and said variable resistance, and a saturable reactor circuit comprising a pair of saturable reactors each having an alternating current coil and a control coil, said control coils being electrically associated one with each of said plate circuits to receive the output of the associated tube and an alternating current supply circuit having two sets of output terminals and being adapted for connection to a single alternating current power source, one terminal of each of said sets of output terminals being adapted for connection by a common lead to the power source, the remaining terminal of one of said sets of output terminals being connected only to the alternating current coil of one of said saturable reactors, and the remaining terminal of the other of said sets of output terminals being connected only to the alternating current coil of the other of said saturable reactors.

2. An electrical control circuit comprising a direct current signal input circuit comprising a pair of electron tubes each having a plate, a cathode and a grid, a plate circuit for each of said tubes adapted to have a common plate voltage source, a variable resistance intermediate the voltage source and the cathodes, and a separate grid circuit for each of said tubes adapted to have a common grid bias means with the tubes biased to have equal flow of current at zero impressed signal and the grid circuits arranged to cause increased current flow in one of the tubes and correspondingly decreased current flow in the other of the tubes upon increase of signal magnitude, increased or decreased flow through a tube being dependent upon the sign of the signal, and a saturable reactor circuit comprising a pair of saturable reactors each having an alternating current coil and a control coil, said control coils being electrically associated one with each of said plate circuits to receive the output of the associated tube, and an alternating current supply circuit having two sets of output terminals and adapted for connection to a single alternating current power source, one terminal of each of said sets of output terminals being adapted for connection by a common lead to the power source, the remaining terminal of one of said sets of output terminals being connected only to the alternating coil of one of said saturable reactors, and the remaining terminal of the other of said sets of output terminals being connected only to the alternating current coil of the other of said saturable reactors.

PAUL GLASS.

REFERENCES CITED

The following references are of record in the file of this patent:

UNITED STATES PATENTS

| Number | Name | Date |
|---|---|---|
| 1,948,372 | Fitzgerald | Feb. 20, 1934 |
| 1,955,322 | Brown | Apr. 17, 1934 |
| 2,136,695 | Laing | Nov. 15, 1938 |
| 2,402,210 | Ryder et al. | June 18, 1946 |
| 2,437,140 | Waldie | Mar. 2, 1948 |